United States Patent [19]

Swanson et al.

[11] Patent Number: 5,442,480
[45] Date of Patent: Aug. 15, 1995

[54] LENS/ZONE PLATE COMBINATION FOR CHROMATIC DISPERSION CORRECTION

[75] Inventors: Gary J. Swanson, Lexington, Mass.; Miles Scott, Palm Bay, Fla.

[73] Assignee: Massachusetts Institute of Technology, Cambridge, Mass.

[21] Appl. No.: 115,393

[22] Filed: Aug. 31, 1993

Related U.S. Application Data

[63] Continuation of Ser. No. 985,466, Dec. 3, 1992, abandoned, and a continuation of Ser. No. 823,594, Jan. 17, 1992, abandoned, and a continuation of Ser. No. 479,955, Feb. 14, 1990, abandoned.

[51] Int. Cl.$^6$ ............... G02B 13/14; G02B 27/44; G02B 5/18
[52] U.S. Cl. .................. 359/355; 359/356; 359/565; 359/569; 359/571
[58] Field of Search ............ 350/162.16, 162.17, 350/162.2, 162.21, 162.22, 162.24, 417; 359/565, 566, 569, 570, 571, 574, 350, 356, 355, 357

[56] References Cited

U.S. PATENT DOCUMENTS

| | | | |
|---|---|---|---|
| 4,637,697 | 1/1987 | Freeman | 350/162.22 |
| 4,639,091 | 1/1987 | Huignard et al. | 350/348 |
| 4,813,762 | 3/1989 | Leger et al. | 350/601 |
| 4,846,552 | 7/1989 | Veldkamp et al. | 350/162.2 |
| 4,895,790 | 1/1990 | Swanson et al. | 350/162.21 |
| 4,936,665 | 6/1990 | Whitney | 350/167 |
| 4,966,446 | 10/1990 | Huang et al. | 350/162.22 |
| 5,044,706 | 9/1991 | Chen | 359/357 |

FOREIGN PATENT DOCUMENTS 9002963  3/1990  WIPO ............ 350/162.22

OTHER PUBLICATIONS

Stone et al; "Hybrid Diffractive-Refractive Lenses and Achromats"; Applied Optics/vol. 27, No. 14/15 Jul. 1988 pp. 2960–2971.

Ishiwatari, "An Optical Cable for a $CO_2$ Laser Scalpel", Journal of Lighwave Technology, LT-4, Aug. 1986, pp. 1273–1279.

*Primary Examiner*—Ricky D. Shafer
*Attorney, Agent, or Firm*—Choate, Hall & Stewart

[57] ABSTRACT

Chromatic dispersion between first and second wavelengths of light is corrected by a lens/zone plate combination. The zone plate is adapted both to send most of the first wavelength light into its zeroth order and to send most of the second wavelength light into its first order and to change the focal length of the second wavelength light to coincide with the focal length of the first wavelength light. A preferred embodiment includes a zinc/selinide sulfide lens having a zone plate etched onto one of its surfaces. The zone plate has a multi-step phase profile including four phase levels. The lens/zone plate combination is particularly adapted for use with $CO_2$ and HeNe lasers to bring their focal lengths into coincidence.

19 Claims, 1 Drawing Sheet

FRESNEL ZONE PLATE PHASE PROFILES

100%

40.5%

81.0%

RADIAL DISTRIBUTION

FIG. 2.1

LENS/ZONE PLATE COMBINATION FOR CHROMATIC DISPERSION CORRECTION

The Government has rights in this invention pursuant to contract Number F19628-85-C-0002 awarded by the Department of the Air Force.

This is a continuation of applications Ser. No. 07/985,466 filed on Dec. 3, 1992 and Ser. No. 07/823,594 filed Jan. 17, 1992 and Ser. No. 07/479,955 filed Feb. 14, 1990, all now abandoned.

BACKGROUND OF THE INVENTION

This invention relates to correction of chromatic dispersion and more particularly to a lens/zone plate combination which corrects chromatic dispersion between light of widely differing wavelengths.

Chromatic dispersion results from an optical material having different indices of refraction for different wavelengths of light. Because of this, light of one wavelength passing through the lens will focus to a different point from light of another wavelength also passing through the lens. Chromatic dispersion is a particular problem in $CO_2$ laser systems with zinc selinide lenses used for applications such as laser welding and laser surgery. Because $CO_2$ laser light is invisible, visible light from a HeNe laser is routinely used in conjunction with $CO_2$ lasers as an alignment aid. An example is a laser scalpel employing a HeNe laser to locate the focal point of the $CO_2$ laser light which performs the surgery.

A major limitation of using a HeNe laser beam for locating the focal point in a zinc selinide $CO_2$ laser system is chromatic dispersion. The large wavelength difference between light from a $CO_2$ laser and a HeNe laser, coupled with the dispersion characteristics of zinc selinide, results in the two wavelengths focusing at significantly different locations. The focal points of the two beams must be made to coincide if the HeNe beam is to be useful for locating the focal point of the $CO_2$ laser.

In conventional lens design, chromatic dispersion is usually corrected by construction of a doublet consisting of two lenses with different dispersion characteristics. A doublet can, in principle, correct for chromatic dispersion between any two wavelengths. A problem arises, however, if one wants to construct a doublet to correct for chromatic dispersion between $CO_2$ (10.6 $\mu$m) and HeNe (0.6328 $\mu$m) laser wavelengths. This is the case because zinc selinide and zinc sulfide are the only readily available optical materials that transmit both 10.6 $\mu$m and 0.6328 $\mu$m radiation. The doublet approach is therefore not practical.

Chromatic dispersion between two wavelengths can also be compensated for with an air spaced doublet consisting of two lenses of the same material. This approach has recently been proposed to correct for the dispersion between 10.6 $\mu$m and 0.6328 $\mu$m radiation in a zinc selinide system. Major problems inherent with this scheme, however, are that the chromatically compensated focal point is virtual and that it works only for low numerical aperture systems. These problems severely limit the usefulness of this approach in most systems where a real focus and a high numerical aperture are desired.

SUMMARY OF THE INVENTION

In accordance with the invention, a zone plate is etched into one surface of a lens. The zone plate sends most of a first wavelength light into its zeroth order and sends most of a second wavelength light into its first order, and changes the focal length of the second wavelength light to coincide with the focal length of the first wavelength light. It is preferred that the zone plate have a multi-step phase profile including four levels.

BRIEF DESCRIPTION OF THE DRAWING

The invention disclosed herein will be understood better with reference to the drawing of which:

FIG. 2.1 is an enlarged view of the zone plate shown in FIG. 2;

DESCRIPTION FOR THE PREFERRED EMBODIMENT

Figure 1:
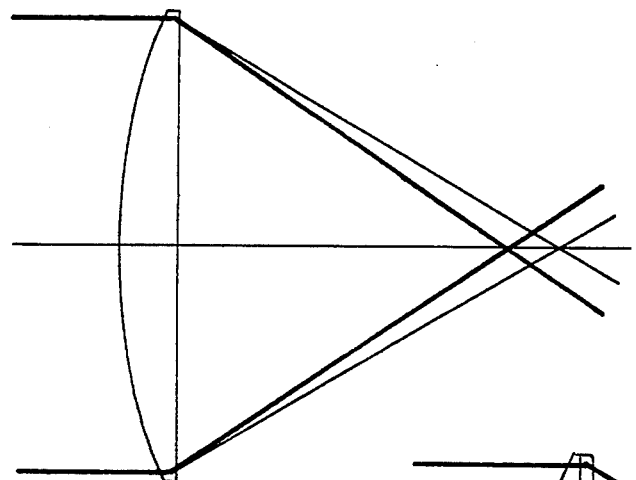
FIG. 1 is a cross-sectional view of a lens.

The problem addressed by the present invention is illustrated in FIG. 1. A zinc selinide lens 10 focuses 0.6328 $\mu$m from a HeNe laser (not shown) at a point 12. Similarly, the lens 10 will focus 10.6 $\mu$m radiation from a $CO_2$ laser at a point 14. As discussed above, visible light from the HeNe laser is used for alignment and to locate the focal spot of the $CO_2$ beam. Under these circumstances, the transmission efficiency of the HeNe beam does not necessarily have to be extremely high. Since the focal points 12 and 14 are not coincident, the zinc selinide/sulfide lens alone cannot be used to locate the $CO_2$ focal point.

Before discussing the specifics of the present invention, a description of lens/zone plate theory will be set forth. Zinc selinide has an index of refraction of n=2.403 for 10.6 $\mu$m radiation and n=2.581 for 0.6328 $\mu$m light. A zinc selinide lens, with radii of curvature $R_1$ and $R_2$ will have a difference in focal length, $\Delta F$, for the two wavelengths given by $$\frac{1}{\Delta F} = \frac{(n_1 - 1)(n_2 - 1)}{\Delta n} \left( \frac{1}{R_1} - \frac{1}{R_2} \right)$$

where $\Delta n = n_2 - n_1$. In theory, a zone plate which is seen by both wavelengths (i.e., using the same diffraction order for both wavelengths) could be etched into a lens to correct for the chromatic dispersion. For this case, the zone plate should have a focal length for the HeNe beam given by $$\frac{1}{F'} = \frac{\lambda_2}{\Delta \lambda} \Delta n \left( \frac{1}{R_1} - \frac{1}{R_2} \right)$$

such that the resulting lens/zone plate combination would have a focal length of $$\frac{1}{F} = (n_2 - 1) \left( \frac{1}{R_1} - \frac{1}{R_2} \right) + \frac{1}{F'}$$

for both wavelengths. The problem with this technique is two-fold. The diffraction efficiency of on-axis zone plates is generally limited. Secondly, because of the wavelength selective nature of defractive elements, a zone plate cannot be made which has high efficiency for two wavelengths that are widely separated. The limitations of this correction scheme may be exploited in order to construct a useful lens/zone plate combination.

The diffraction efficiency of an on-axis phase zone plate is a function of the phase depth to which it is etched. An ideal (100% efficient) on-axis zone plate has a maximum phase depth of one wavelength. Thus, a zone plate etched for high efficiency at 0.6328 $\mu$m will have a phase depth of only 0.05 lambda for the 10.6 $\mu$m $CO_2$ beam. The $CO_2$ beam will propagate through the zone plate diffracting less than 3% of its energy since the phase depth is such that the $CO_2$ beam essentially does not see the zone plate. The majority of the energy of the $CO_2$ beam will remain in the zero order while the majority of the HeNe beam will be diffracted into the first order. In practice, it is very difficult to construct an optimal zone plate with 100% diffraction efficiency. As will be shown later, however, it is relatively easy to construct zone plates with efficiencies approaching 80%.

Figure 2:
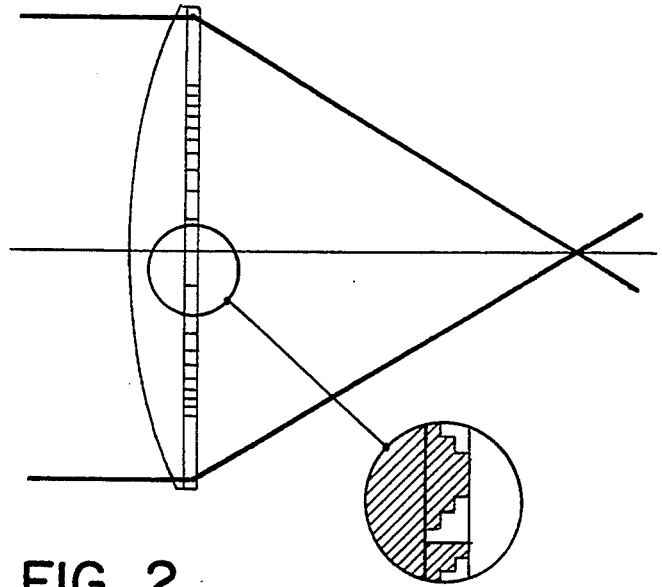
FIG. 2 is a cross-sectional view of a lens/zone plate combination according to the present invention.

The present invention is illustrated in FIG. 2. The zinc selinide/sulfide lens 10 includes a zone plate 16 etched into one of its surfaces. As will be discussed hereinbelow, the zone plate 16 has a phase depth such that the zone plate sends most of the HeNe beam into its first order and most of the $CO_2$ beam into its zeroth order. In this way the focal points of the $CO_2$ and HeNe radiation are brought into coincidence at a point 18. As shown in the inset of FIG. 2, it is preferred that the zone plate 16 include multi-step binary levels 20, as shown in FIG. 2.1, to improve the efficiency of the HeNe beam.

Using the fact that a zone plate can be etched such that it sends most of the HeNe beam into its first order and most of the $CO_2$ beam into its zeroth order, it is a straightforward task to design a lens/zone plate combination that corrects for chromatic aberrations between the two wavelengths. A zone plate is required that will shift the focal point of the HeNe beam by $\Delta F$. Thus, the zone plate should have, to first order, a focal length of $$\frac{1}{F'} = -\Delta n \left( \frac{1}{R_1} - \frac{1}{R_2} \right)$$

As can be seen in FIG. 2, the smallest fringe spacing and fringe width of a zone plate occur at the aperture edge of the lens. These feature sizes are determined by the numerical aperture of the zone plate. For reasonable $CO_2$ systems, the numerical aperture of the correcting zone plate is less than or equal to 0.1. The corresponding minimum feature sizes are p ≈ 12 $\mu$m d ≈ 6 $\mu$m where p is the minimum fringe period and d is the minimum fringe width. Drawing patterns with such feature sizes are easily done using either standard optical pattern generators or electron beam writers. The positioning accuracy of these mask writers is 0.15 $\mu$m. The first diffraction order from a zone plate written by one of these machines will have a wavefront accuracy of ($\lambda/20$).

Figure 3:
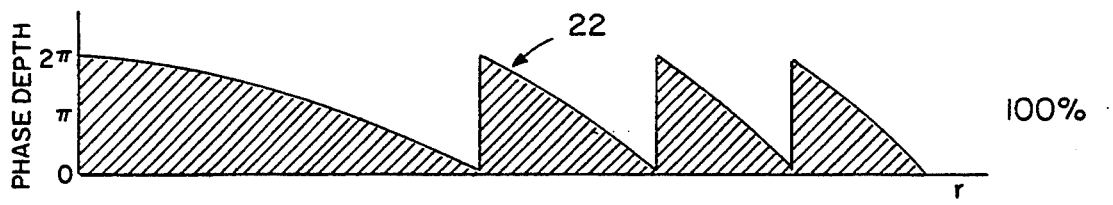
FIG. 3 is a graphical illustration of a zone plate having a continuous phase profile.
Figure 4:
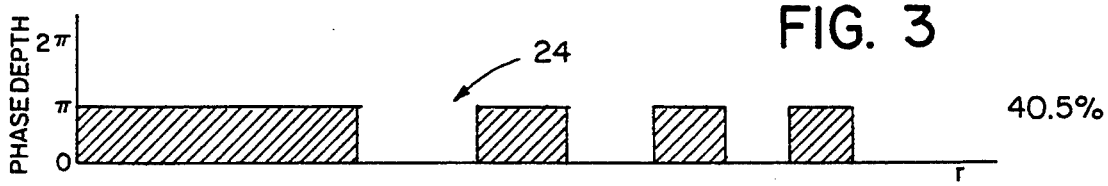
FIG. 4 is a graphical illustration of a zone plate having a binary phase profile.
Figure 5:
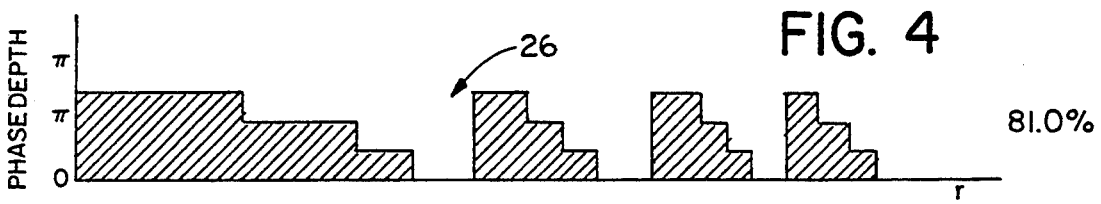
FIG. 5 is a graphical illustration of a zone plate having a multi-step phase profile.

A remaining consideration is to produce a phase profile on the zone plate 16 that will diffract the majority of the HeNe beam and a very little of the $CO_2$ beam. FIGS. 3, 4 and 5 show three zone plate profiles. FIG. 3 shows a continuous phase profile 22 that has 100% diffraction efficiency into the first order for 0.6328 $\mu$m light. A system has been proposed to construct these continuous profiles using an interferometerically controlled lathe. However, it may not be possible to control the phase depth well enough to achieve efficiencies near 100%.

FIG. 4 shows a binary phase profile 24 which is easy to produce. The binary structures can be made by standard lithographic techniques. A binary amplitude mask is written by a pattern generator. This mask is then contact printed onto a resist coated substrate. The patterned resist profile is then etched into the surface of the substrate using either a wet or dry etching process. The main limitation to the binary profile 24 is that its theoretical maximum diffraction efficiency is only 40.5%

It is preferred that a phase profile 26 shown in FIG. 5 be utilized. The profile 26 is an intermediate profile between those shown in FIGS. 3 and 4. It is easily constructed, as is the binary profile 24, yet has a diffraction efficiency approaching that of the continuous profile 22. Producing the profile 26 is accomplished by using the same tools used to produce the binary profile 24. Two binary amplitude masks are generated, and their patterns sequentially etched into the substrate. The resulting four level phase profile 26 has a theoretical maximum diffraction efficiency into the first order of 81%. The majority of the remaining light resides in the −3rd diffraction order which is a diverging beam at the system output. Thus, the focal point of the first order is readily identifiable and coincides with the $CO_2$ beam focal point.

When etched into the zinc selinide lens 10, the zone plate 16 should have a maximum phase depth of 0.75 (lambda) for the HeNe beam. The $CO_2$ beam will see a zone plate with a maximum phase depth of 0.04 (lambda). That is, the $CO_2$ beam sees a very shallow phase structure so that very little of the $CO_2$ beam energy is diffracted into the first order. Estimating a worst possible case, one can model the structure as a 50% duty cycle square wave grating with a 0.04 (lambda) phase depth. This worst case estimate results in the undiffracted $CO_2$ beam retaining 98% of its original energy. The zinc selinide lens/zone plate combination of the present invention thus corrects for the large focal length difference between $CO_2$ beam will be focused to the same point. The present invention thus allows the focal point of the invisible $CO_2$ light to be determined very accurately by the visible HeNe light.

Although the present invention has been described in conjunction with a zinc selinide lens, it is to be understood that the present invention has application to correcting chromatic dispersion between virtually any two widely separated wavelengths in any appropriate material which passes the wavelengths of interest and can be anisotropically etched, such as zinc sulfide. The lens/zone plate combination of the present invention is readily fabricated with existing techniques (e.g. argon ion milling or methane reactive ion etching) techniques. It is recognized that modifications and variations of the present invention will occur to those skilled in the art and it is intended that all such modifications and variations be included within the scope of the appended claims.

What is claimed is:

1. An optical apparatus for correcting chromatic dispersion between an infrared light source and a visible light source of substantially differing wavelengths, comprising a lens/zone plate combination, the zone plate having a phase depth on the order of the wavelength of the visible light to transmit substantially all of the infrared light into its zeroth order and to diffract most of the visible light into its first order, thus changing the focal length of the visible light to coincide with the focal length of the infrared light.

2. The optical apparatus of claim 1 wherein the zone plate has a focal length of $$\frac{1}{F'} = -\Delta n \left( \frac{1}{R_1} - \frac{1}{R_2} \right)$$

where $\Delta n$ is the difference in the index of refraction of the lens for the first and second wavelengths of light and $R_1$ and $R_2$ are the radii of curvature of the surfaces of the lens.

3. The optical apparatus of claim 1 wherein the zone plate has a multi-step phase profile.

4. The optical apparatus of claim 3 wherein the multi-step phase profile includes 4 phase levels.

5. The optical apparatus of claim 4 wherein the zone plate profile is produced utilizing two binary amplitude masks and subsequent etching.

6. The optical apparatus of claim 5 wherein the two binary amplitude masks are written by a pattern generator.

7. The optical apparatus of claim 5 wherein the two binary amplitude masks are generated by electron beam writers.

8. The optical apparatus of claim 1 wherein the lens is zinc selinide and the zone plate is etched into one surface of the lens.

9. The optical apparatus of claim 8 wherein the first wavelength light is 10.6 μm and the second wavelength light is 0.6328 μm.

10. The optical apparatus of claim 1 wherein the lens is zinc sulfide and the zone plate is etched into one surface of the lens.

11. The optical apparatus of claim 1 wherein said infrared light has a wavelength of about 10.6 μm and said visible light has a wavelength of about 0.6328 μm.

12. The optical apparatus of claim 1 wherein the zone plate has a numerical aperture less than or equal to 0.1.

13. The optical apparatus of claim 1 wherein the zone plate has a continuous phase profile.

14. The optical apparatus of claim 13 wherein the zone plate profile is produced using an interferometerically controlled lathe.

15. Optical apparatus for correcting chromatic dispersion between light from a $CO_2$ laser and a HeNe laser comprising a zinc selinide lens having a zone plate etched on one of its surfaces, the zone plate having a phase depth of 0.75 of the wavelength from the HeNe laser and having a four level phase profile.

16. The optical apparatus of claim 15 wherein the numberical aperture of the zone plate is less than or equal to 0.1.

17. The optical apparatus of claim 15 wherein the zone plate profile is produced utilizing two binary amplitude masks with subsequent etching.

18. The optical apparatus of claim 17 wherein the two binary amplitude masks are written by a pattern generator.

19. The optical apparatus of claim 17 wherein the two binary amplitude masks are generated by electron beam writers.

* * * * *